Patented Mar. 3, 1931

1,795,173

UNITED STATES PATENT OFFICE

HANS LEHRECKE, OF FRANKFORT-ON-THE-MAIN, GERMANY

PROCESS OF RENDERING INSOLUBLE PHOSPHATES AVAILABLE

No Drawing. Application filed January 28, 1929, Serial No. 335,731, and in Germany January 26, 1928.

This invention relates to a process of rendering useful, insoluble phosphates, particularly natural mineral phosphates, and for which I have filed application in Germany, January 26, 1928.

In rendering useful the phosphorus content of insoluble phophates such as for example natural mineral phosphates, by heating said phosphates with suitable additions, for example for the purpose of producing an easily assimilable fertilizer it was hitherto customary either to transform the entire phosphorus content of the initial material in the molten or sintered decomposition product into the citric acid- or citrate-soluble form, for example into so-called calcined phosphates, or the like, or to remove the entire phosphorus content from the initial materials by treating same with reducing agents and other suitable additions and driving off the phosphorus formed, in which latter case the phosphorus distilling over was transformed into phosphoric acid by burning for example with air, or into another water-soluble form, for example into monocalcium phosphate or the like, and the residual slag was either thrown to waste, or worked up into bricks and similar products. Since the portions of phosphoric acid remaining in these residues were thus rendered unavailable for recovery and utilization, it was necessary to take care to ensure that the amounts thereof were kept as low as possible, that is to say that as much phosphorus or phosphoric acid as possible was driven off from the initial materials during their decomposition. This however entails not only an excessively long duration of the decomposition process, but also the employment of disproportionately high temperatures and the consumption of large amounts of fuel whilst simultaneously the material of the furnace is subjected to extremely great wear by the attack of the reacting mass.

According to the present invention the additions and conditions of operation are so selected that only a part, for example about 50 to 55% of the total phosphorus present in the initial material is driven off as such for recovery in a water-soluble form and transformed for example into phosphoric acid, whilst the remainder in the slag is transformed into a citric acid- or citrate-soluble form.

It is thus possible to utilize the total phosphorus content of the initial material to the greatest possible extent whilst greatly economizing in fuel and greatly decreasing wear on the furnace material, at considerably lower temeperatures in a very short time which generally amounts to about one half of that required in the known processes.

The conditions are advantageously so selected that the slag obtained has the composition of a silico-phosphate of optimum solubility in citric acid or citrate solution. Thus for example it may be a silico-phosphate of the formula $(CaO)_5.P_2O_5.SiO_2$. It is however within the scope of the invention to produce a slag of a composition differing from this formula. The additional substances which are suitable for use comprise every type of carbon, for example ground coke, or carboniferous substances, carboniferous waste products of all kinds and the like and silica of any type.

The amount of carbon or carboniferous additions to be employed is equivalent to the amount of phosphorous which it is desired to obtain by driving off, and is generally so adjusted that about 5 atoms of carbon are employed per molecule of phosphoric acid to be reduced, in accordance with the equation:

$$P_2O_5 + 5C = P_2 + 5CO.$$

The total amount of carbon may for example be such that about 25-55% (advantageously about 50-55%) of the available phosphorus is converted into a volatilized state.

The proportion by weight of the silica to the phosphorus pentoxide present may be selected, in the residual slag, for example to correspond to the foregoing formula i. e., about 0.42 and the ratio of CaO to $P_2O_5$ may be selected to be about 1.97. Accordingly if only about one half of the phosphorus present is to remain behind in the slag, the amounts of the added substances must be so adjusted that in the original mixture the proportion by weight of $SiO_2 : P_2O_5$ amounts to about 0.21 and the ratio $CaO:P_2O_5$ to about 0.99 in which case any excess lime which may be present in the raw phosphate must be taken care of by a suitable addition of silica, advantageously in such a manner that the lime is transformed into calcium orthosilicate. Moreover no undesired losses of phosphoric acid need be feared even when employing an excess of silica, since any phosphoric acid liberated by the excess silica cannot generally distil over at the relatively low operating temperatures which come into consideration.

Temperature of between 1000 to 1400° C. and primarily between about 1250 to 1400° C. have proved suitable as operating temperatures.

By way of example, by calcining a mixture of about 100 parts of a raw phosphate (containing 36% $P_2O_5$, 6% $SiO_2$ and 47 to 48% CaO) with about 7 to 10 parts of carbon and about 8 to 10 parts silica at 1200 to 1400° C. and after driving off about 50% of the total phosphorus contained in the raw phosphate employed, a calcined residue is obtained which contains the remainder of the phosphorus, the bulk of which is in the citric acid soluble form and constitutes an excellent fertilizer, whereas the expelled phosphorus can be transformed in known manner into phosphoric acid by burning for example with air and furthermore, into any desired other products which may for example likewise be used as fertilizers.

When employing phosphates which per se contain less than the required amount of silica, it is possible to add the silica also wholly or partly in the form of phosphates richer in silica instead of adding the silica as such.

Instead of bringing the calcined product after cooling into the finely powdered form in which it is required as use for a fertilizer, for example, by grinding or the like, the still hot calcined residue may advantageously be quenched with water or with suitable solutions such as a raw potash salt solution, for example by introducing the same into water or into such solutions or spraying the solutions on to said product for example, in a cooling drum provided with a suitable spraying device, in which case a very considerable comminution can be attained, on occasion with a simultaneous hydration of the product.

The term "carbon" employed herein and in the appended claims is intended to denote any carbon-containing substance of any kind and particularly all kinds of fossil carbon, coke and also coal and any waste products containing carbon in any form whatsoever. Likewise the term "silica" ($SiO_2$) employed herein and in the appended claims is intended to comprise all types of silica and also acid silicates as well as products containing silica as such or in the form of acid silicates, for example waste products.

Claims—

1. A process of rendering useful insoluble phosphates, which comprises heating substances containing insoluble phosphates at temperatures of from about 1000–1400° C. with such amounts of carbon and silica-containing additions that a part of the total phosphorus content of the initial material is liberated by the carbon in accordance with the equation $P_2O_5+5C=P_2+5CO$ and that in the calcined residue containing the other part of the phosphorus the proportion of the constituents $P_2O_5$, $SiO_2$ and CaO is about 0.9–1.1 molecules of $P_2O_5$ to about 0.9–1.1 molecules of $SiO_2$ to about 4.8–5.2 molecules of CaO.

2. A process of rendering useful insoluble phosphates, which comprises heating substances containing insoluble mineral phosphates at temperatures of from about 1000–1400° C. with such amounts of carbon and silica containing additions that a part of the total phosphorus content of the initial material is liberated by the carbon in accordance with the equation $P_2O_5+5C=P_2+5CO$ and that in the calcined residue containing the rest of the phosphorus the proportion of the constituents $P_2O_5$, $SiO_2$ and CaO is about 0.9–1.1 molecules of $P_2O_5$ to about 0.9–1.1 molecules of $SiO_2$ to about 4.8–5.2 molecules of CaO.

3. A process of rendering useful insoluble phosphates, which comprises heating substances containing insoluble phosphates at temperatures of from about 1000–1400° C. with such amounts of carbon and silica containing additions that about 25 to 55% of the total phosphorus contained in the initial material is liberated by the carbon in accordance with the equation $P_2O_5+5C=P_2+5CO$ and that in the calcined residue containing the rest of the phosphorus the proportion of the constituents $P_2O_5$, $SiO_2$ and CaO is about 0.9–1.1 molecules of $P_2O_5$ to about 0.9–1.1 molecules of $SiO_2$ to about 4.8–5.2 molecules of CaO, continuing the heating until the desired amount of phosphorus will be distilled off, thereupon crushing the calcined residue in a known manner to the fineness required for its further use.

4. Process of rendering useful insoluble phosphates which comprises heating insoluble mineral phosphates at temperatures of about 1000–1400° C. with such amounts of carbon and silica as are required to liberate about 25–55% of the total phosphorus contained in the initial material in accordance with the equation $P_2O_5+5C=P_2+5CO$ and to ensure that the composition of the resultant residue after driving off the liberated phosphorus corresponds approximately to the formula $5(CaO).P_2O_5.SiO_2$.

5. Process of rendering useful insoluble phosphates, which comprises heating insoluble mineral phosphates at temperatures of about 1000–1400° C. with such amounts of carbon and silica that there are present in the initial mixture about 0.18–0.24 parts by weight of C and about 0.18–0.24 parts by weight of total $SiO_2$ and about 0.85–1.13 parts by weight total CaO per part by weight of the total $P_2O_5$ present.

6. Process of rendering useful insoluble phosphates, which comprises heating insoluble mineral phosphates containing more than 0.99 parts by weight of total CaO per part of total $P_2O_5$ at temperatures of about 1000–1400° C. with such amounts of carbon and silica that about 0.18–0.24 parts by weight C, about 0.18–0.24 parts by weight $SiO_2$ are contained in the initial mixture per part by weight of $P_2O_5$ and moreover that at least about one part by weight of $SiO_2$ is contained therein for each part by weight of CaO present in excess of the aforesaid amount.

7. Process as set forth in claim 3, in which when employing mineral phosphates containing less than the required amount of $SiO_2$, the balance of $SiO_2$ is added at least partly in the form of phosphates richer in $SiO_2$.

In testimony whereof I affix my signature.

HANS LEHRECKE.